(12) United States Patent
Nakamura

(10) Patent No.: US 6,977,020 B2
(45) Date of Patent: Dec. 20, 2005

(54) METHOD OF MOUNTING A PNEUMATIC RADIAL TIRE

(75) Inventor: Tsutomu Nakamura, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 31 days.

(21) Appl. No.: 09/840,824

(22) Filed: Apr. 25, 2001

(65) Prior Publication Data

US 2001/0045263 A1 Nov. 29, 2001

(30) Foreign Application Priority Data

Apr. 25, 2000 (JP) ......................................... 2000-123587

(51) Int. Cl.⁷ ........................... B29D 30/00; B60C 3/00; B60C 9/18; B60C 9/22
(52) U.S. Cl. ................. 156/110.1; 29/428; 152/209.11; 152/454; 152/526; 152/531; 152/535; 152/904
(58) Field of Search .............................. 156/110.1, 117; 152/209.11, 454, 526, 531, 533, 535, 538, 904; 29/428

(56) References Cited

U.S. PATENT DOCUMENTS

| | | | | |
|---|---|---|---|---|
| 4,244,415 A | * | 1/1981 | Peter et al. | ............... 152/209.5 |
| 4,510,983 A | * | 4/1985 | Ohkuni et al. | |
| 4,880,043 A | * | 11/1989 | Decima et al. | |
| 4,966,215 A | * | 10/1990 | Oka | |
| 5,301,730 A | * | 4/1994 | Delias | ......................... 152/531 |
| 5,339,878 A | * | 8/1994 | Takase | |
| 5,373,886 A | * | 12/1994 | Yamaguchi et al. | |
| 5,431,208 A | * | 7/1995 | Aoki et al. | ............. 152/209.26 |
| 5,718,784 A | * | 2/1998 | Takamatsu | |
| 5,795,418 A | * | 8/1998 | Suzuki | ........................ 152/530 |
| 5,975,175 A | * | 11/1999 | Armellin | |
| 6,244,315 B1 | * | 6/2001 | Armellin | |
| 6,260,596 B1 | * | 7/2001 | Ubukata et al. | |
| 6,397,911 B1 | * | 6/2002 | Armellin et al. | |

FOREIGN PATENT DOCUMENTS

| | | |
|---|---|---|
| EP | 0 756 949 A1 | 2/1997 |
| EP | 0 808 730 A1 | 11/1997 |
| FR | 2 756 778 A1 | 6/1996 |
| JP | 3-25005 * | 2/1991 |
| JP | 4-24102 * | 1/1992 |
| JP | 6-64577 * | 3/1994 |
| JP | 6-344706 * | 12/1994 |
| JP | 2000-43506 * | 2/2000 |

OTHER PUBLICATIONS

Patent Abstracts of Japan, vol. 018, No. 479 (M–1669) (Sep. 07, 1994) as it relates to JP 06 156015 issued Jun. 03, 1994 and assigned to Bridgestone Corporation.

* cited by examiner

Primary Examiner—Steven D. Maki
(74) Attorney, Agent, or Firm—Sughrue Mion, PLLC

(57) ABSTRACT

In the method of mounting a pneumatic radial tire comprising a spiral belt and a pair cross belt members arranged in parallel to each other at both sides of an equational plane of the tire and at a given opening space onto a vehicle body, the tire is mounted as a front tire and/or a rear tire so as to contact a portion of the cord in the belt member facing the opening space with ground under a given condition in a forward rotating direction of the tire.

4 Claims, 7 Drawing Sheets

METHOD OF MOUNTING A PNEUMATIC RADIAL TIRE

BACKGROUND OF THE INVENTION

1. Field of the Invention

This invention relates to a pneumatic radial tire capable of making optimum a deformation and a resistance force of the tire in correspondence to a difference between external forces respectively acting to a front tire and a rear tire and more particularly to a method of mounting a pneumatic radial tire suitable for use in motorcycles and the like.

2. Description of Related Art

There have hitherto been known various structures as a pneumatic tire for a vehicle such as motorcycles and the like. With the maintenance of recent expressways, it is required to ensure a high-speed durability even in pneumatic radial tires for motorcycles. For this end, there are also known tires having a spiral belt extending in a circumferential direction of a crown portion thereof.

And also, there are known a mounting structure that tires having only a spiral belt are mounted onto a front wheel and a rear wheel of a motorcycle, respectively, and a mounting structure that a tire having a combination of a spiral belt with a pair of cross belt members containing cords therein, the cords of which members being crossed with each other, is used only in either a front wheel or a rear wheel of a motorcycle.

However, when the radial tire having the spiral belt and the pair of cross belt members is mounted onto either the front wheel or the rear wheel of the motorcycle, there is no technique that an angle of the cord in the cross belt member is clearly defined with respect to each of the front and rear tires.

In each of the conventional front and rear tires, therefore, the balance of rigidity, ground contact property and generation of lateral force in the tire is not satisfactorily achieved. To this end, the above tires have a drawback that convergence of vibration behavior in a vehicle body as a whole, running performances including cornering force at a corner, gripping limit and slip controlling property are not obtained at sufficiently high levels, respectively.

SUMMARY OF THE INVENTION

With the forgoing in mind, it is an object of the invention to provide a method of mounting a pneumatic radial tire capable of making optimum the deformation and the resistance force of the tire in correspondence to the difference between external forces respectively acting to the front tire and the rear tire.

According to a first aspect of the invention, there is the provision of in a method of mounting a pneumatic radial tire comprising a spiral belt formed by spirally winding a cord along a circumferential direction of a crown portion of the tire, and a pair of cross belt members arranged in parallel to each other at both sides of an equatorial plane of the tire and at a given opening space, cords of which members being extended at a given cord angle in opposite directions to each other with respect to the equatorial plane, an improvement wherein the tire is mounted as a front tire such that the pair of cross belt members are arranged so as to finally contact a portion of the cord in the belt member facing the opening space with ground in a forward rotating direction of the tire.

The action of the above mounting method is described below. That is, when the above tire is mounted on a front wheel of a vehicle such as motorcycle or the like, the pair of the cross belt members in the tire are arranged so as to finally contact a portion of the cord in the belt member facing the opening space with ground in a forward rotating direction of the tire. Thus, the inclinations of the cords in the cross belt members are so-called inverted herringbone form that the portion of the cord in the belt member facing to the opening space finally contact with ground in the forward running direction of the tire or a positive rotating direction thereof. Therefore, by mounting the above tire as a front tire so as to render the cord inclinations in the pair of the cross belt members into the inverted herringbone form, the deformation and resistance force of the tire are made optimum against external force acting to the front tire.

According to a second aspect of the invention, there is the provision of in a method of mounting a pneumatic radial tire comprising a spiral belt formed by spirally winding a cord along a circumferential direction of a crown portion of the tire, and a pair of cross belt members arranged in parallel to each other at both sides of an equatorial plane of the tire and at a given opening space, cords of which members being extended at a given cord angle in opposite directions to each other with respect to the equatorial plane, an improvement wherein the tire is mounted as a rear tire such that the pair of cross belt members are arranged so as to firstly contact a portion of the cord in the belt member facing the opening space with ground in a forward rotating direction of the tire.

The action of the above mounting method is described below. That is, when the above tire is mounted onto a rear wheel of a vehicle such as motorcycle or the like, the pair of the cross belt members in the tire are arranged so as to firstly contact a portion of the cord in the belt member facing the opening space with ground in a forward rotating direction of the tire. Thus, the inclinations of the cords in the cross belt members are so-called herringbone form that the portion of the cord in the belt member facing to the opening space firstly contact with ground in the forward running direction of the tire or a positive rotating direction thereof. Therefore, by mounting the above tire as a rear tire so as to render the cord inclinations in the pair of the cross belt members into the herringbone form, the deformation and resistance force of the tire are made optimum against external force acting to the rear tire.

According to a third aspect of the invention, there is the provision of in a method of mounting a pneumatic radial tire comprising a spiral belt formed by spirally winding a cord along a circumferential direction of a crown portion of the tire, and a pair of cross belt members arranged in parallel to each other at both sides of an equatorial plane of the tire and at a given opening space, cords of which members being extended at a given cord angle in opposite directions to each other with respect to the equatorial plane, an improvement wherein the tire is mounted as a front tire such that the pair of cross belt members are arranged so as to finally contact a portion of the cord in the belt member facing the opening space with ground in a forward rotating direction of the tire and another tire is mounted as a rear tire such that the pair of cross belt members are arranged so as to firstly contact a portion of the cord in the belt member facing the opening space with ground in a forward rotating direction of the tire.

The action of the above mounting method is described below.

That is, when the pair of the front and rear tires are mounted onto front and rear wheels of a vehicle such as motorcycle or the like, by mounting one of the above tires as a front tire so as to render the cord inclinations in the pair of the cross belt members into the inverted herringbone form and the other tire as a rear tire so as to render the cord inclinations in the pair of the cross belt members into the herringbone form, the deformation and resistance force of the tire are made optimum in correspondence to the difference between external forces respectively acting to the front tire and the rear tire.

That is, by adopting the above mounting method, the rigidity required as the tire can effectively be ensured with respect to input of the external forces to the radial direction and lateral direction of the tire acting to the front and rear tires at each state of the straight running and the cornering. And also, the external force acting to the front wheel in the braking and the external force acting to the rear wheel in the traction differ with each other in the input direction of the external force, but by making the cord inclinations of the belt members in the front tire opposite to those in the rear tire can effectively be ensured the rigidity required as the tire against these external forces.

In a preferable embodiment of the invention, a steel cord having an initial tensile strength of no less than 50 cN/cord is used in any one of the spiral belt and the pair of the cross belt members. That is, when the steel cords having an initial tensile strength of no less than 50 cN/cord are applied to any one of the spiral belt and the cross belt member, the rigidity required as the tire can effectively be ensured and is possible to cope with external forces applied from various directions.

In a further preferable embodiment of the invention, a organic fiber cord having an initial tensile strength of no less than 50 cN/cord is used in any one of the spiral belt and the pair of the cross belt members. That is, when the organic fiber cords having an initial tensile strength of no less than 50 cN/cord are applied to any one of the spiral belt and the cross belt member, the rigidity required as the tire can effectively be ensured and is possible to cope with external forces applied from various directions.

Moreover, the spiral belt and the cross belt member may be constituted by combining the steel cord and the organic fiber cord. For example, there may be a combination that the spiral belt is made of the steel cords and each of the pair of cross belt members is made of the organic fiber cords and a combination that the spiral belt is made of the organic fiber cords and each of the pair of cross belt members is made of the steel cords.

In the other preferable embodiment of the invention, the pair of cross belt members are arranged at the spiral belt as an outer layer or an inner layer so as to make an angle of the cord constituting each belt member with respect to the equatorial plane within a range of 80–20° as measured at the side of an acute angle, and a total width of the pair of cross belt members including the opening space is 150–70% of a tread width and a width of the opening space is 1–50 mm.

That is, when the angle of the cord constituting each cross belt member with respect to the equatorial plane exceeds 80°, the rigidity as the tire is not sufficiently ensured, while when the angle is less than 20°, the step difference of the rigidity between the presence and the absence of the cross belt member pair becomes too large and the linear property of cornering force with respect to the camber angle is damaged. Therefore, the angle is restricted to a range of 80–20°.

On the other hand, when the total width of the pair of cross belt members is less than 70% of the tread width, the rigidity required as the tire can not be ensured, while when the total width exceeds 150% of the tread width, the rigidity as the tire becomes too high and the degradation of the vibration absorptivity is caused, so that the total width is restricted to a range of 150–70%.

Furthermore, when the width of the opening space between the pair of cross belt members is less than 1 mm, the opening space is too small and the bending rigidity in the vicinity of the center of the crown portion becomes too high, so that the ride comfort is degraded. While, when the width of the opening space exceeds 50 mm, the effect of ensuring the rigidity required as the tire is substantially lost. Therefore, the width of the opening space between the pair of cross belt members is restricted to a range of 1–50 mm.

BRIEF DESCRIPTION OF THE DRAWINGS

The invention will be described with reference to the accompanying drawings, wherein.

DETAILED DESCRIPTION OF THE INVENTION

A first embodiment of the pneumatic radial tire according to the invention is described with reference to FIGS. 1 to 3.

Figure 1:
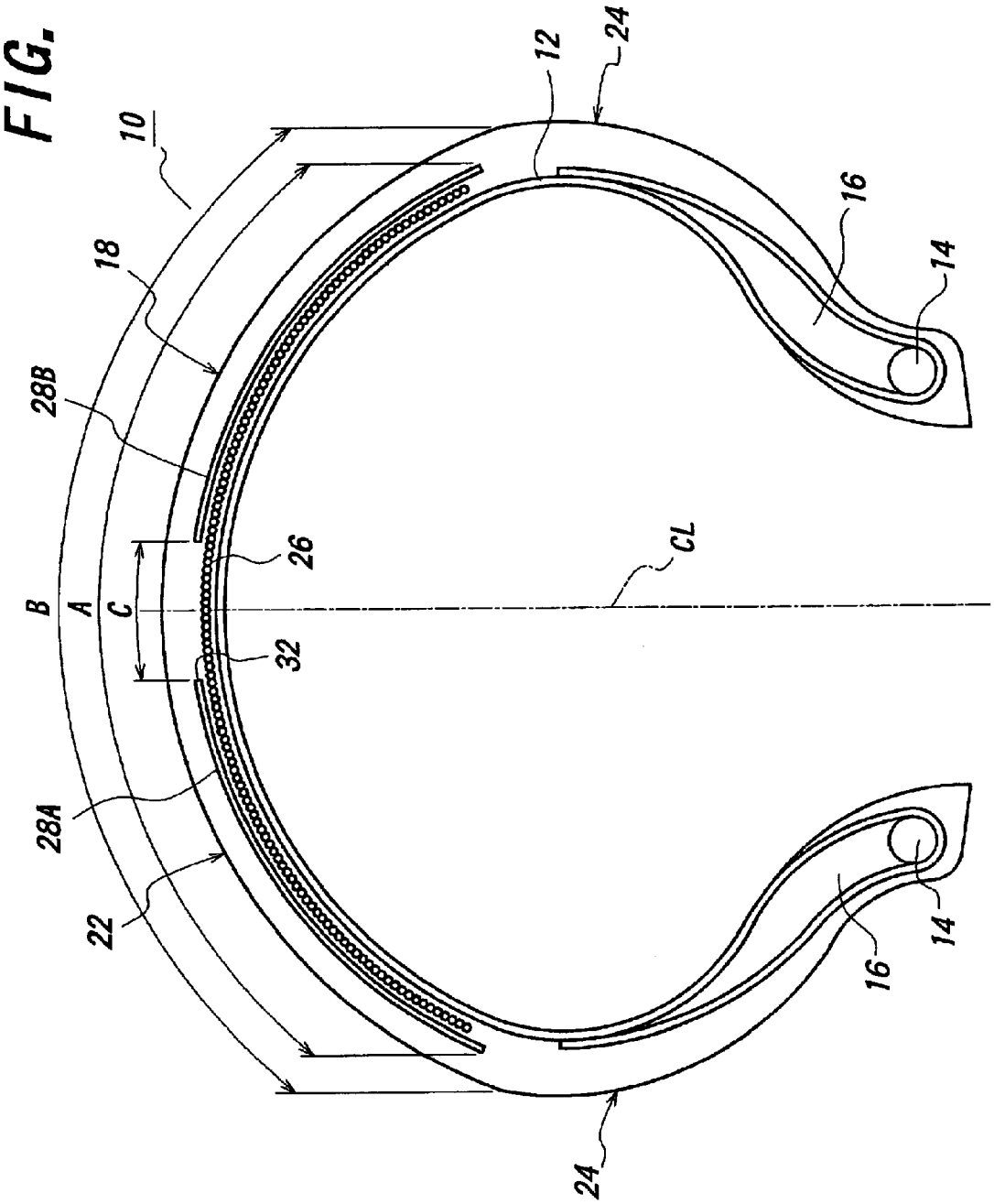
FIG. 1 is a diagrammatically section view of a first embodiment of the pneumatic radial tire according to the invention.

In FIG. 1 is shown a motorcycle tire 10 of radial structure as the first embodiment of the pneumatic radial tire according to the invention. A carcass 12 constituting a skeleton of the tire 10 is formed by a plurality of plies (not shown) each containing cords such as polyester cord or the like arranged in a direction crossing with an equatorial plane CL of the tire 10.

A pair of bead cores 14 each formed by winding and bundling steel wires in a ring shape are arranged in the vicinity of both end portions of the carcass 12, and both the end portions of the carcass 12 are wound around these bead cores 14, respectively. Furthermore, a tapered bead filler 16 made of a hard rubber is embedded between the carcass 12 and a turnup portion thereof above the bead core 14.

As mentioned above, the carcass 12 is extended between the pair of the bead cores 14 and embedded in a rubber material forming a crown portion 18 of the tire 10 through a sidewall portion 24 of the tire 10 connecting the bead core 14 to the crown portion 18. The equatorial plane CL extends along the circumferential direction of the crown portion 18 so as to divide the tire 10 in half.

Furthermore, a tread 22 made of a rubber material as an envelope contacting with a road face is arranged side a ground contact face of the crown portion 18 and a tread pattern having ribs defined by a plurality of grooves is formed on the tread 22. Moreover, an innerliner (not shown) is arranged as an innermost layer of the tire 10.

Figure 2:
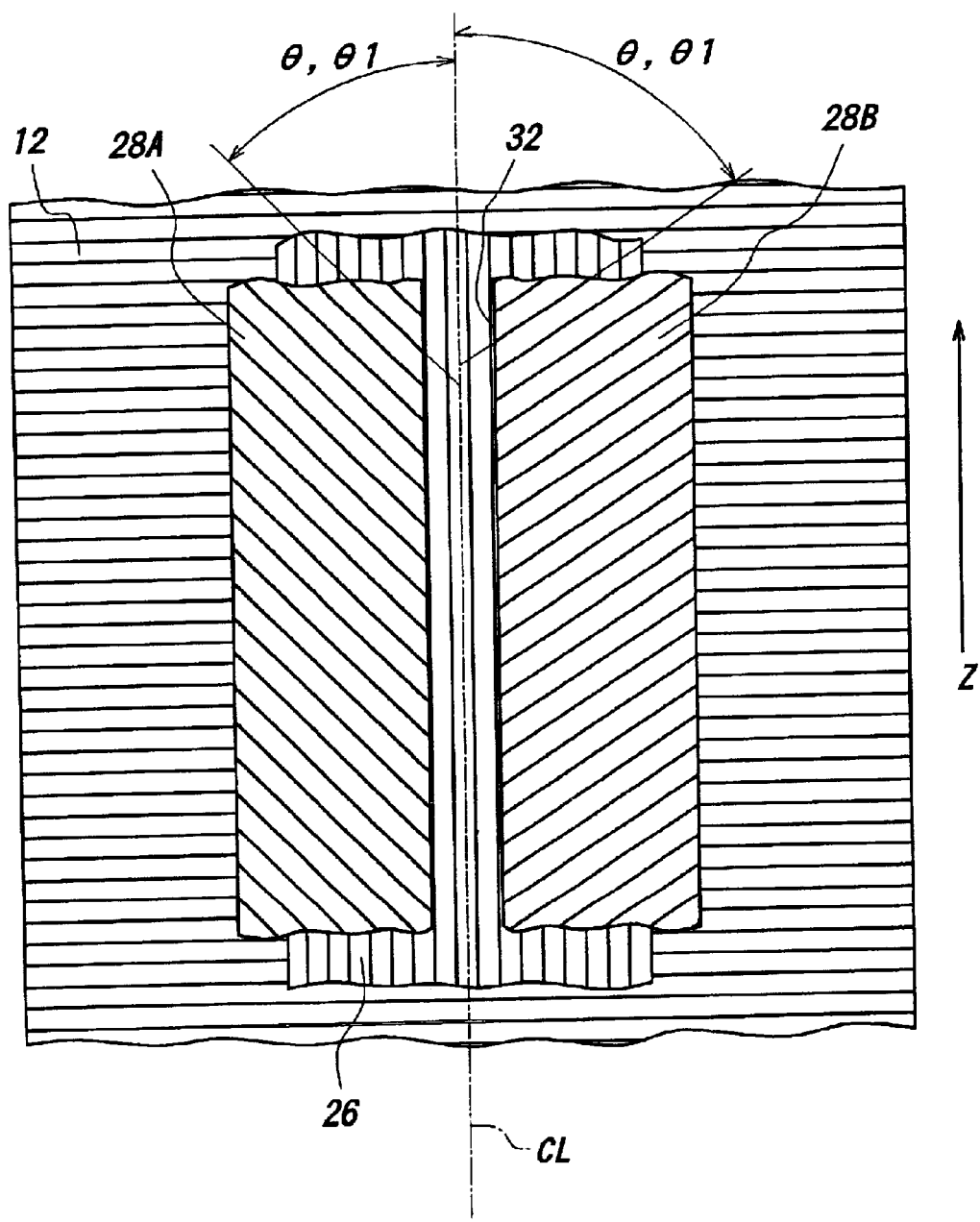
FIG. 2 is a diagrammatically partial developed view of a belt structure at a state of mounting the first embodiment of the pneumatic radial tire according to the invention onto a front wheel of a vehicle.
Figure 3:
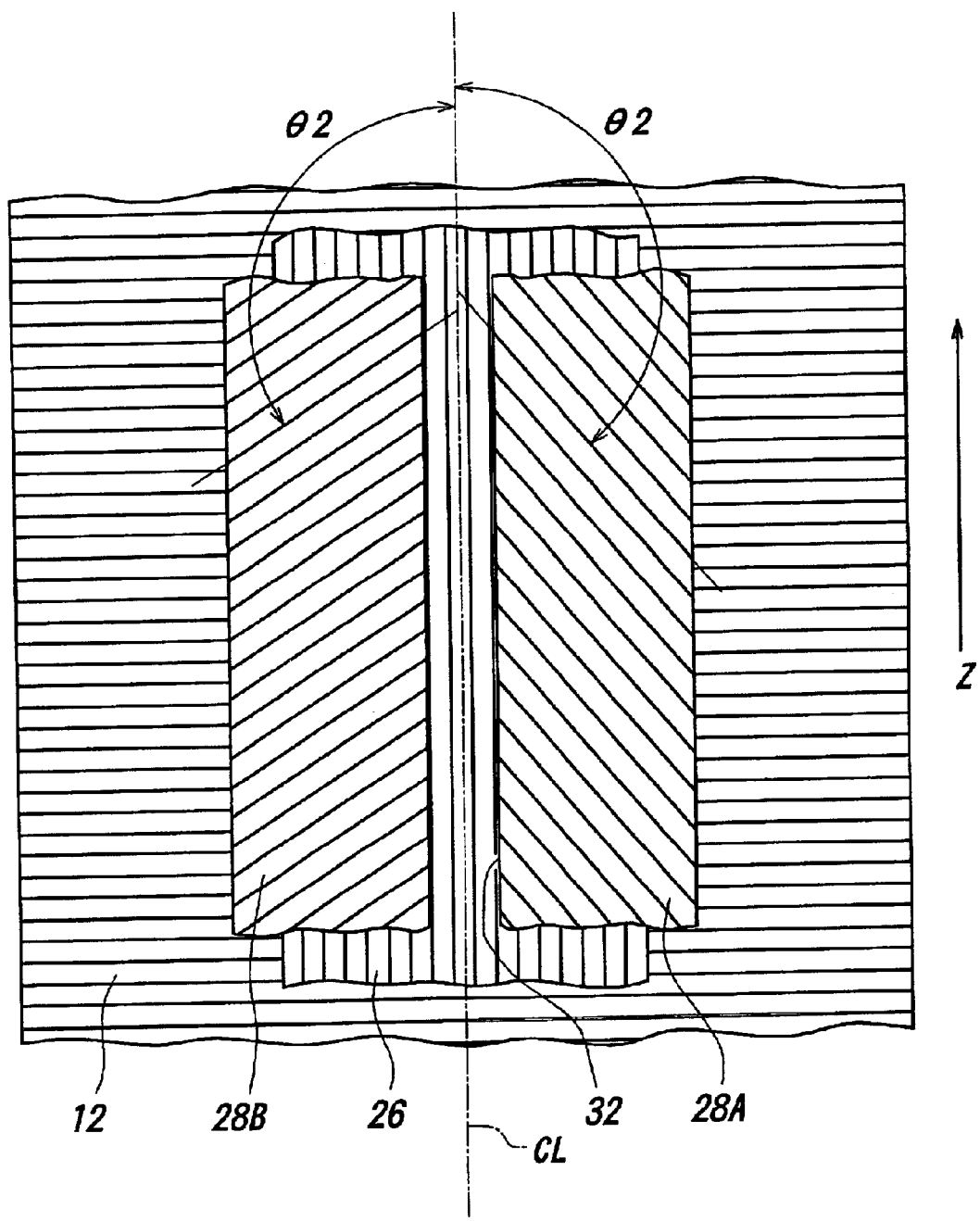
FIG. 3 is a diagrammatically partial developed view of a belt structure at a state of mounting the first embodiment of the pneumatic radial tire according to the invention onto a rear wheel of a vehicle.

As shown in FIGS. 1–3, a spiral belt 26 being a mono-spiral belt formed by spirally winging a cord along the circumferential direction of the crown portion 18 is embedded in the rubber material forming the crown portion 18 at the outer circumferential side of the carcass 12, and a pair of cross belt members 28A, 28B extending in parallel to each other in a common curved plane are arranged on the outer circumferential side of the spiral belt 26 at both sides of the equatorial plane CL of the tire, respectively.

A total width A of the pair of cross belt members 28A, 28B including an opening space 32 formed therebetween is set within a range of 150–70% of a width B of the tread 22 as measured along an arc of the tire surface, and a width C of the opening space 32 between the pair of cross belt members 28A, 28B is set to a range of 1–50 mm.

Further, as shown in FIG. 2, cords constituting the pair of cross belt members 28A, 28B extend at a symmetrical inclination angle with respect to the equatorial plane CL of the tire in directions opposite to each other. In this case, an angle θ between the cord and the equatorial plane CL as measured at an acute angle side is made to 80–20°. Moreover, a steel cord or a organic fiber cord having an initial tensile strength of no less than 50 cN per cord is used as the cord constituting each of the spiral belt 26 and the cross belt members 28A, 28B.

On the other hand, when the tire 10 is mounted onto as a front tire for a motorcycle, as shown in FIG. 2, the pair of cross belt members 28A, 28B are arranged so as to finally contact a portion of the cord in the belt member facing the opening space 32 with ground in a forward rotating direction of the tire (direction by an arrow Z in FIG. 2), whereby the tire 10 is mounted so that an angle θ1 of the cord in the cross belt members 28A, 28B with respect to the equatorial plane CL is an acute angle.

And also, when the tire 10 is mounted as a rear tire of the motorcycle, as shown in FIG. 3, the pair of cross belt members 28A, 28B are arranged so as to firstly contact a portion of the cord in the belt member facing the opening space 32 with ground in a forward rotating direction of the tire (direction by an arrow Z in FIG. 3), whereby the tire 10 is mounted so that an angle θ2 of the cord in the cross belt members 28A, 28B with respect to the equatorial plane CL is an obtuse angle. Moreover, the term "forward rotating direction of tire" used herein means the rotating direction of the tire 10 when the motorcycle goes forward.

The action of the pneumatic radial tire 10 according to the first embodiment of the invention will be described below.

In the pneumatic tire 10, not only the spiral belt 26 formed by spirally winding the cord along the circumferential direction of the crown portion 18 is arranged, but also the pair of cross belt members 28A, 28B containing cords extended at an angle opposite to each other with respect to the equatorial plane CL of the tire are arranged at the outside of the spiral belt 26 and on both sides of the equatorial plane CL in parallel to each other and at a given opening space 32. And also, the angle θ of the cord constituting each of the cross belt members 28A, 28B with respect to the equatorial plane CL is made to 80–20° as measured at the acute angle side.

That is, when the angle θ of the cord constituting each of the cross belt members 28A, 28B with respect to the equatorial plane CL in the tire exceeds 80°, the rigidity of the tire is not sufficient ensured, while when the angle θ is less than 20°, the step difference of the rigidity between the presence and the absence of the cross belt members 28A, 28B becomes too large and hence the linear property to a change of a camber is damaged. Therefore, the angle θ is restricted to a range of 80–20°.

Moreover, in case of mounting the tire 10 onto the vehicle, the tire 10 is mounted as a front tire such that the pair of cross belt members 28A, 28B are arranged so as to finally contact a portion of the cord in the belt member facing the opening space 32 with ground in a forward rotating direction of the tire to thereby render the angle θ1 of the cord in the cross belt members 28A, 28B with respect to the equatorial plane CL into an acute angle as shown in FIG. 2.

And also, the tire 10 is mounted as a rear tire such that the pair of cross belt members 28A, 28B are arranged so as to firstly contact a portion of the cord in the belt member facing the opening space 32 with ground in a forward rotating direction of the tire to thereby render the angle θ2 of the cord in the cross belt members 28A, 28B with respect to the equatorial plane CL into an obtuse angle as shown in FIG. 3.

Therefore, the pneumatic tires 10 are mounted onto the motorcycle as the front and rear tires in such a manner that the inclination of the cord in the pair of the cross belt members 28A, 28B are so-called inverted herringbone form of finally contacting the portion of the cord in the belt member facing to the opening space 32 with ground in the front tire as shown in FIG. 2 and so-called herringbone form of firstly contacting the portion of the cord in the belt member facing to the opening space 32 with ground in the rear tire as shown in FIG. 3. As a result, the deformation and the resistance force of the tire are made optimum in correspondence to the difference of the external forces acting to the front and rear tires.

That is, by the above mounting method can effectively be ensured the rigidity required as the tire against the input of external forces in the radial and lateral directions of the tire acting to the front and rear tires at each state of the straight running and the cornering. Furthermore, the external force acting to the front wheel in the braking and the external force acting to the rear wheel in the traction differ with each other in the input direction of the external force, but by making the cord inclinations of the belt members 28A, 28B in the front and rear tires opposite to each other can effectively be ensured the rigidity required as the tire against these external forces.

In the first embodiment of the invention, therefore, it is possible to improve the cornering force and the responsibility thereof at the states of the straight running and the cornering and ensure a proper self-aligning torque and a proper absorbing property with respect to the external force input from a road surface along the radial direction of the tire.

As a result, the resistance to handle shimmy, the high-speed stability (reduction and convergence of vibration amplitude in wobbling), the quick response and turning force, the corner gripping limit and the slipping controllability (property not steering in sudden cornering) can easily be improved.

On the contrary, if the cord inclination in the pair of cross belt members 28A, 28B in the front tire is set to the herringbone form, the cornering force is not sufficiently raised in the cornering state and hence the turning force is not sufficiently developed. And also, if the cord inclination in the pair of cross belt members 28A, 28B in the rear tire is set to the inverted herringbone form, the cornering force is not sufficiently raised at an accelerating state during the cornering and hence the turning force and the limit of uncontrollable state are not sufficiently developed. To this end, the rigidity required as the tire can not be ensured, so that the deformation of the tire becomes large to increase the posture change of the vehicle body, and also the slipping controllability can not sufficiently be ensured.

On the other hand, in the first embodiment of the invention, as the cord constituting the spiral belt 26 and the pair of cross belt members 28A, 28B is used a steel cord or a organic fiber cord having an initial tensile strength of no less than 50 cN/cord. That is, when the cord is a steel cord or a organic fiber cord having an initial tensile strength of no less than 50 cN per cord, the rigidity required as the tire can effectively be ensured and it is possible to cope with external forces applied from various directions.

Moreover, in the first embodiment of the invention, as shown in FIG. 1, the total width A of the pair of cross belt members 28A, 28B including the opening space 32 is made to 150–70% of the tread width B and the width C of the opening space 32 is made to 1–50 mm. When the total width A is less than 70% of the tread width B, the rigidity required as the tire can not be ensured, while when the total width A exceeds 150% of the tread width B, the rigidity of the tire becomes too high, so that the degradation of the vibration absorptivity occurs.

On the other hand, when the width C of the opening 32 is less than 1 mm, the opening space 32 is small and the bending rigidity in the vicinity of the center of the crown portion 18 becomes too high, and hence the ride comfort is degraded. While, when the width C exceeds 50 mm, the effect of ensuring the rigidity required as the tire is substantially lost likewise the above case.

Figure 4:
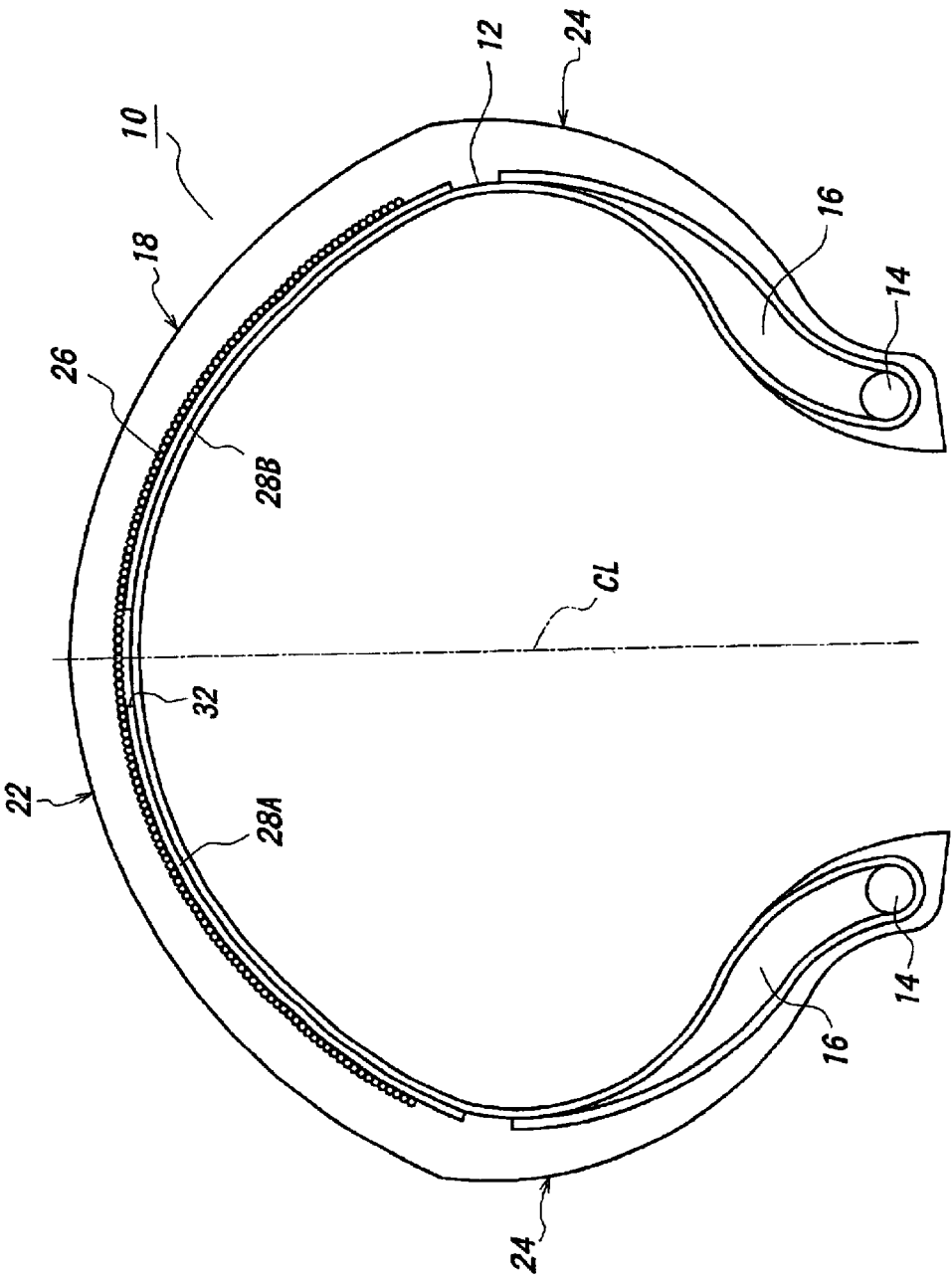
FIG. 4 is a diagrammatically section view of a second embodiment of the pneumatic radial tire according to the invention.

Next, a second embodiment of the pneumatic radial tire according to the invention is shown in FIG. 4, wherein the same members as described in the first embodiment are the same numerals as those described in the first embodiment and the redundant description is omitted.

As shown in FIG. 4, the second embodiment has substantially the same structure as the first embodiment except that the pair of cross belt members 28A, 28B are arranged at an inner circumference side of the spiral belt 26 instead of being arranged at an outer circumference side of the spiral belt 26 in the first embodiment.

In the second embodiment, the cords constituting the cross belt members 28A, 28B extend at an inclination angle opposite to each other with respect to the equatorial plane CL of the tire within the same range as in the first embodiment, and the initial tensile strength of the cord is also the same as in the first embodiment. When such a tire 10 is mounted as each of the front and rear tires for the motorcycle, the same mounting method as described in the first embodiment is adopted.

As seen from the above, even in the second embodiment, the deformation and the resistance force of the tire are made optimum in correspondence to the difference of the external forces acting to the front and rear tires likewise the first embodiment.

Figure 5:
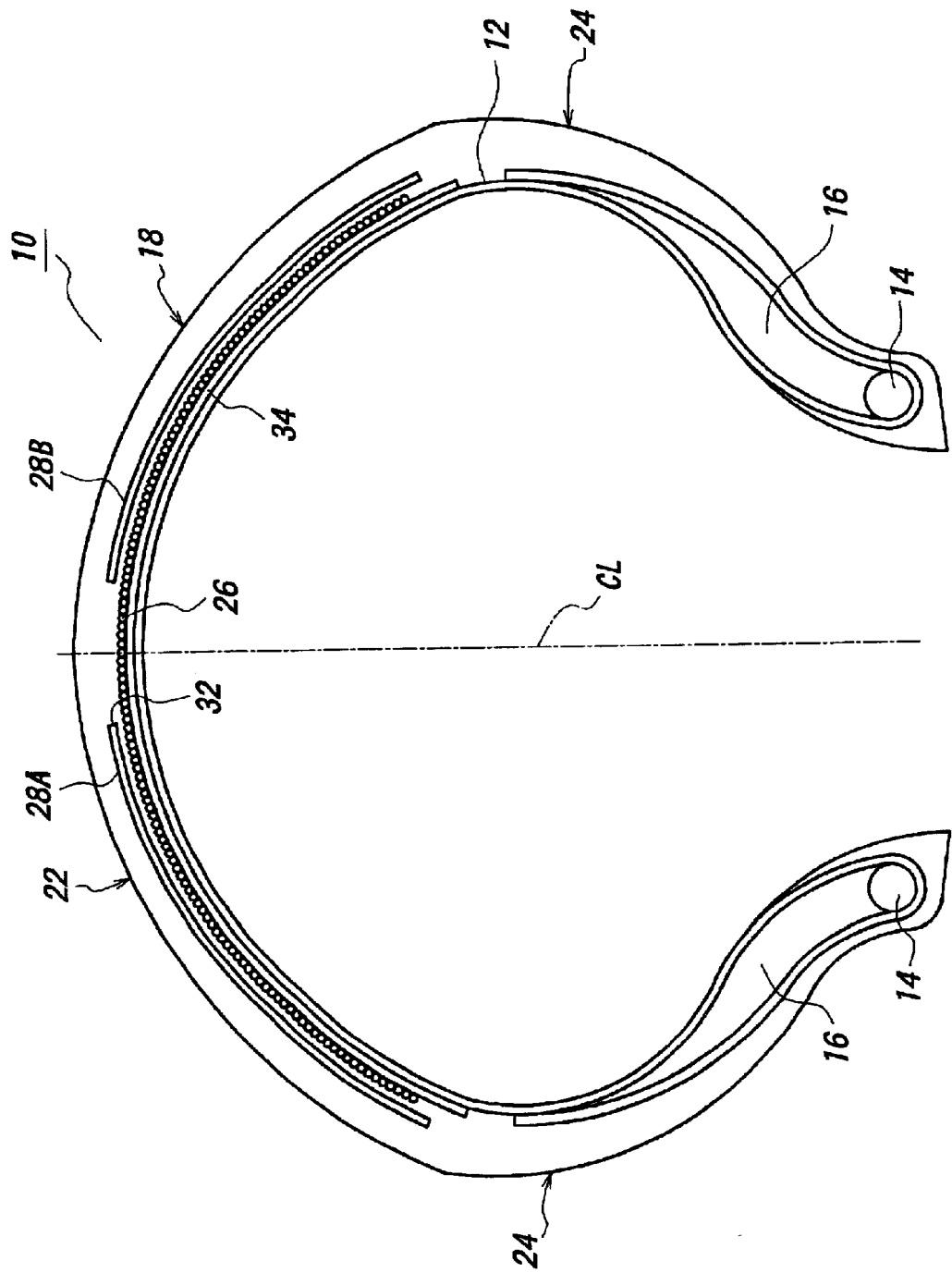
FIG. 5 is a diagrammatically section view of a third embodiment of the pneumatic radial tire according to the invention.

Next, a third embodiment of the pneumatic radial tire according to the invention is shown in FIG. 5. The third embodiment has substantially the same structure as in the first embodiment except that an auxiliary belt 34 is further arranged between the carcass 12 and the spiral belt 26 as shown in FIG. 5. In this case, the cords constituting the auxiliary belt 34 are inclined at a given cord angle with respect to the equatorial plane CL. Thus, the spiral belt 26 is sandwiched between the pair of cross belt members 28A, 28B and the auxiliary belt 34.

Even in the third embodiment, the tires 10 are mounted as the front and rear tires for the motorcycle in the same manner as in the first embodiment. In this case, the deformation and the resistance force of the tire are further improved owing to the presence of the auxiliary belt 34.

Figure 6:
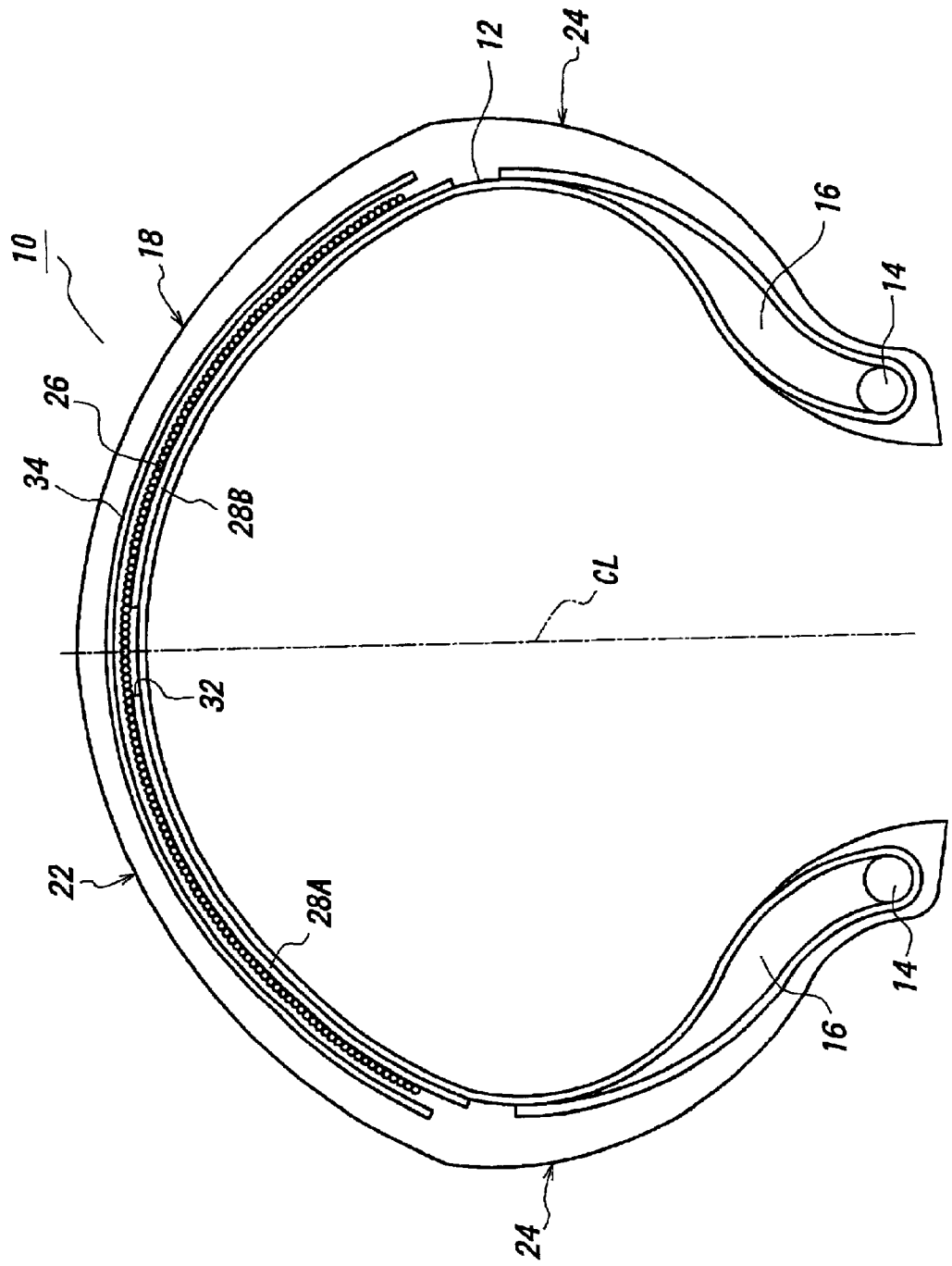
FIG. 6 is a diagrammatically section view of a fourth embodiment of the pneumatic radial tire according to the invention.

Next, a fourth embodiment of the pneumatic radial tire according to the invention is shown in FIG. 6. This embodiment is substantially the same structure as in the third embodiment except that the arrangement of the pair of cross belt members 28A, 28B and the auxiliary belt 34 is opposite to that of the third embodiment as shown in FIG. 6. Even in the fourth embodiment, the tires 10 are mounted as the front and rear tires for the motorcycle in the same manner as in the first embodiment. In this case, the deformation and the resistance force of the tire are further improved owing to the presence of the auxiliary belt 34 likewise the third embodiment.

The following examples are given in illustration of the invention and are not intended as limitations thereof.

Figure 7:
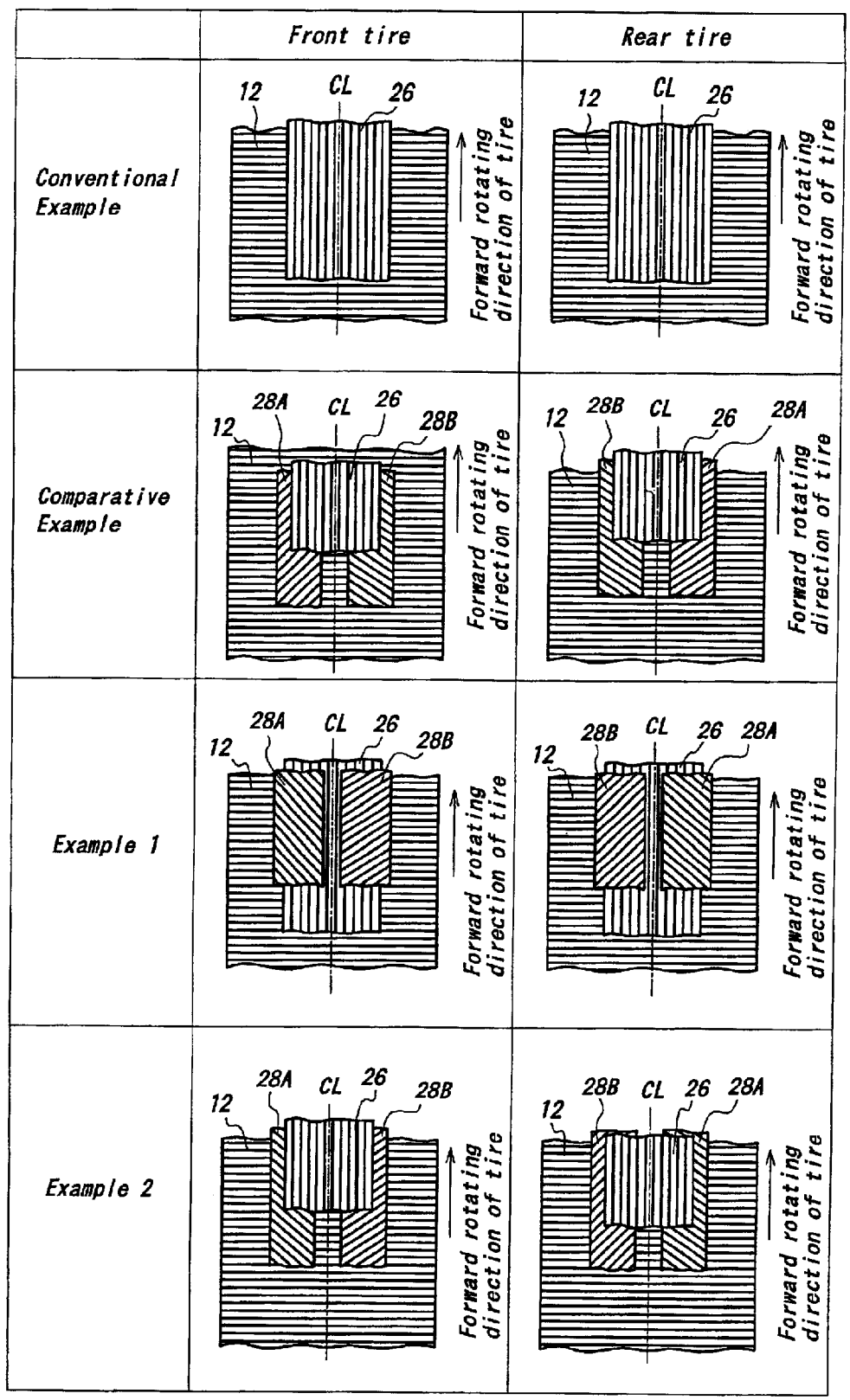
FIG. 7 is diagrammatically partial developed views illustrating the arrangement of carcass, spiral belt and cross belt members viewing from outsides of the conventional, comparative and example tires used for the evaluation by actual running test.

As shown in FIG. 7, Example 1 uses the pneumatic radial tire 10 described in the first embodiment and Example 2 uses the pneumatic radial tire 10 described in the second embodiment. For the comparison, the conventional example uses a tire with a belt structure having no pair of cross belt members 28A, 28B and the comparative example uses a tire having a spiral belt 26 and a pair of cross belt members 28A, 28B except that the cord inclination in the pair of the cross belt members takes a herringbone form in a front tire and an inverted herringbone form in a rear tire. With respect to these examples, the actual running test is carried out to obtain results as shown in Table 1.

TABLE 1

|  | | | Handling | | Corner gripping | |
| --- | --- | --- | --- | --- | --- | --- |
|  | High-speed stability | Shimmy | Quick response | Neutral property | Gripping limit | Slipping controllability |
| Conventional Example | 100 | 100 | 100 | 100 | 100 | 100 |
| Comparative Example | 110 | 110 | 110 | 100 | 105 | 105 |
| Example 1 | 130 | 120 | 130 | 120 | 120 | 120 |
| Example 2 | 120 | 120 | 120 | 110 | 110 | 110 |

The evaluation by the actual running test is an evaluation by a feeling of a test driver for the high-speed stability, shimmy, handling and corner gripping limit. From the results of Table 1, it can be understood that all evaluation points in Examples 1 and 2 are higher than those of Convention Example and Comparative Example.

In Table 1, each evaluation point is represented by an index on the basis that the tire of Conventional Example 1 is 100, in which the larger the index value, the better the evaluation. Furthermore, the tires used in the actual running test have tire sizes of 120/70ZR17 as a front tire and 190/50ZR17 as a rear tire, respectively, while a rim used for the front tire has a size of MT3.50×17 and a rim used for the rear tire has a size of MT6.00×17. And also, an air pressure is 250 kPa in both the front and rear tires, and a motorcycle of YAMAHA R1 is used as a test vehicle.

On the other hand, as the material of the cord used in the spiral belt and the cross belt member according to the invention, not only the steel but also the organic fiber can be adopted as mentioned above. As an example of the organic fiber, there are mentioned aramid as an aromatic polyamide, PEN, PET, rayon, nylon as an aliphatic polyamide and the like, but the other resin materials may be used.

And also, an aramid cord or a steel cord can be used in the spiral belt.

As mentioned above, the method of mounting the pneumatic radial tire according to the invention has an excellent effect that the deformation and resistance force of the tire can be made optimum in correspondence to a difference between external forces respectively applied to the front and rear tires.

What is claimed is:

1. A method of mounting first and second pneumatic radial motorcycle tires each comprising a spiral belt formed by spirally winding a cord along a circumferential direction of a crown portion of the tire, and a pair of cross belt members arranged on an outer circumferential side of the spiral belt and in parallel to each other in a common curved plane in a circumferential direction of the tire so as to be disposed on opposites sides of an equatorial plane of the tire and separated by an opening space, wherein cords of one of the cross belt members extend in a direction opposite to cords of the other one of the cross belt members with respect to the equatorial plane, the method comprising mounting the first tire onto a front wheel of a vehicle such that the cords of the pair of cross belt members have an acute angle of inclination with respect to the equatorial plane in a forward rotating direction of the first tire, and mounting the second tire onto a rear wheel of the vehicle such that the cords of the pair of cross belt members have an obtuse angle of inclination with respect to the equatorial plane in the forward rotating direction of the second tire.

2. A method of mounting a pneumatic radial motorcycle tire according to claim 1, wherein a steel cord having an initial tensile strength of no less than 50 cN/cord is used in any one of the spiral belt and the pair of the cross belt members.

3. A method of mounting a pneumatic radial motorcycle tire according to claim 1, wherein a organic fiber cord having an initial tensile strength of no less than 50 cN/cord is used in any one of the spiral belt and the pair of the cross belt members.

4. A method of mounting a pneumatic radial motorcycle tire according to claim 1, wherein the pair of cross belt members are arranged so as to make an angle of the cord constituting each belt member with respect to the equatorial plane within a range of 80–20° as measured at the side of an acute angle, and a total width of the pair of cross belt members including the opening space is 150–70% of a tread width and a width of the opening space is 1–50 mm.

* * * * *